United States Patent [19]

Prete, Jr. et al.

[11] 4,026,218

[45] May 31, 1977

[54] RATTLE PROOF ANCHOR FITTING FOR SECURING LOADS TO A RETAINER TRACK

[75] Inventors: Ernest Prete, Jr., Woodland Hills; Howard T. Knox, Hawthorne, both of Calif.

[73] Assignee: Ancra Corporation, El Segundo, Calif.

[22] Filed: Sept. 8, 1975

[21] Appl. No.: 611,433

[52] U.S. Cl. .......................... 105/482; 24/265 CD; 403/370

[51] Int. Cl.² ..................... B60P 7/08; B61D 45/00

[58] Field of Search .......................... 105/475–483; 24/265 CD; 280/179 R, 179 A, 179 B; 248/361 A; 403/370, 374, 381, 409

[56] References Cited

UNITED STATES PATENTS

| 3,241,501 | 3/1966 | Watts | 280/179 R X |
| 3,605,637 | 9/1971 | Prete, Jr. | 105/482 |
| 3,677,195 | 7/1972 | Prete, Jr. | 105/482 |
| 3,719,156 | 3/1973 | Broling | 105/482 X |

FOREIGN PATENTS OR APPLICATIONS 1,328,637  8/1973  United Kingdom .............. 403/381

Primary Examiner—Drayton E. Hoffman
Assistant Examiner—Fred A. Silverberg
Attorney, Agent, or Firm—Edward A. Sokolski

[57] ABSTRACT

An anchor fitting has flat surface pads with shoulders extending therefrom and a post portion extending along an axis substantially normal to the flat surfaces of the pads. A latching plunger is slidably mounted on the post portion for motion along the longitudinal axis thereof. The fitting is removably retained in a selected position along a slotted track having a plurality of notched portions separated by narrow neck portions formed by flanges with the shoulders of the pads in the track slots underneath the flanges and the latching plunger member seated in one of the notched portions of the track. A cam bar member is supported on the anchor fitting in an apertured portion thereof by means of an adjustment screw. This bar member is drawn against the walls of the apertured portion of the anchor fitting such that it drives against the surface of the track drawing the shoulders of the pads tightly against the walls of the track to provide a tight rattle-proof joinder between the fitting and the track.

3 Claims, 5 Drawing Figures

RATTLE PROOF ANCHOR FITTING FOR SECURING LOADS TO A RETAINER TRACK

This invention relates to an anchor fitting for removably securing a load to a track member at a preselected position therealong, and more paticularly to such a device which incorporates means for tightly joining the device to the track such that rattling of the fitting is obviated.

In vehicles such as aircraft, it is desirable to provide means for selectively anchoring various types of loads such as cargo, passenger seats, etc., in various positions along the floor of the aircraft. The anchoring must be reliable to assure that these loads do not become loose during travel, yet at the same time it is necessary that it be relatively easy to attach and detach the anchoring device from any selected position in the vehicle to permit versatility in loading and conversion from one type of load to another. In U.S. Pat. No. 3,605,637 issued Sept. 20, 1971, an anchor fitting is described which operates in conjunction with an elongated track member having spaced notches formed therein separated by neck portions. The anchor fitting of this prior patent has flat surfaced pads with shoulders extending therefrom, these shoulders fitting in the track slot underneath flanges which form the neck portions between the track notches, with a latching plunger member being seated in one of the notched portions. While this prior art device provides secure fastening of the fitting to the track, oftentimes the fitting and track are not held tightly against each other so that rattling occurs between these two members. This results in undesirable noise.

The present invention is directed to providing an adjustment for eliminating play between the anchor fitting and the track such that the rattling is eliminated. This result is achieved in a simple and economical manner involving a screwdriver adjustment which can be accomplished in the installed position in just a few seconds.

It is therefore an object of this invention to eliminate rattling between anchor fittings and the tracks in which they are mounted.

It is a further object of this invention to provide simple and economical means for enabling the adjustment of an anchor fitting in its installed position in a track so as to prevent rattling thereof.

Other objects of the invention will become apparent as the description proceeds in connection with the accompanying drawings, of which:

Briefly described, the invention is as follows: An anchor fitting has flat surfaced pads with shoulders extending therefrom and a latching plunger member which is slidably mounted on a post portion for motion normal to the flat surfaces of the pads. The anchor member is placed into a slotted track with the shoulders of the pads in the track slots underneath flanges forming neck portions of the track between notched portions thereof. The latching plunger is seated in one of the notched portions to retain the fitting in the track. A cam bar member is retained in an apertured portion of the fitting and has a face thereof which abuts against the top surface of the track. This bar member is threadably engaged by an adjustment screw. When the adjustment screw is tightened, the cam bar member is drawn around a curved wall of the apertured portion of the fitting which provides downward camming action forcing the cam bar member into tight abutment against the surface of the track. This camming action causes a lifting action of the fitting bringing the top surfaces of the pad shoulders against the inner walls of the flange portions of the track, thereby eliminating play between the fitting and the track and thus obviating rattling.

Figure 1:
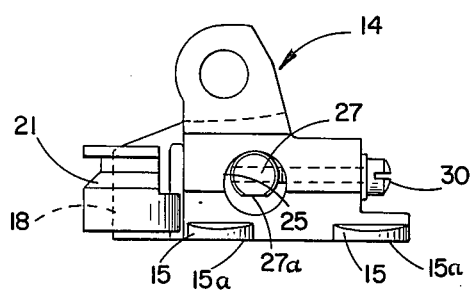
FIG. 1 is a side elevational view of a preferred embodiment of the invention.
Figure 2:
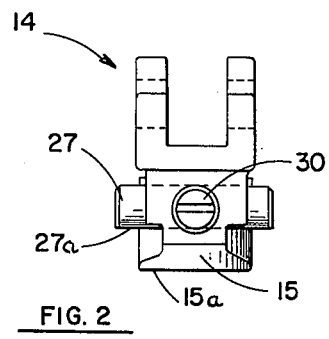
FIG. 2 is an end elevational view of the preferred embodiment.

Referring now to FIGS. 1 and 2, a preferred embodiment of the invention is illustrated. It is to be noted that with the exception of the rattle prevention means and minor design differences, this device is basically the same as that described in my aforementioned U.S. Pat. No. 3,605,637. It is also to be noted that the anti-rattling device of the present invention can be utilized to equal advantage with various adaptations of the device described in U. S. Pat. No. 3,605,637, which use the same basic configuration thereas.

The anchor fitting includes a main body portion 14 which has a pair of spaced base pads 15 along the bottom portion thereof. Pads 15 have flat bottom surfaces 15a. At one end of the main body is a post portion 18, this post portion extending vertically, i.e., normal to surfaces 15a. Slidably supported on post portion 18 for movement parallel to the longitudinal axis thereof is latching plunger member 21. Plunger 21 has a groove 26 formed around the inner wall thereof, into which pin member 22, which is actuated by spring 23, fits when the plunger is in its seated position in the track (see FIG. 3). Pin member 22 and spring 23 are mounted in aperture 24 formed in post portion 18. Groove 26 has a downwardly sloping lower wall 26a and a horizontal upper wall 26b such that once pin member is placed in groove 26 on assembly of the unit, the pin member operates to arrest downward motion of the plunger by virtue of its engagement with wall 26b. The plunger can, however, be moved upwardly with pin member 22 riding along sloped wall 26b. Main body 14 has an aperture 25 formed therein, this aperture being substantially circular. Placed within aperture 25 is cam bar member 27 which is generally cylindrical in form except for a flattened base portion 27a. Aperture 25 is larger than cam bar member 27 to permit a sliding motion of the bar member therearound. Adjusting screw 30 threadably engages bar member 27, there being a washer 31 between the head of the screw and body portion 14.

Figure 4:
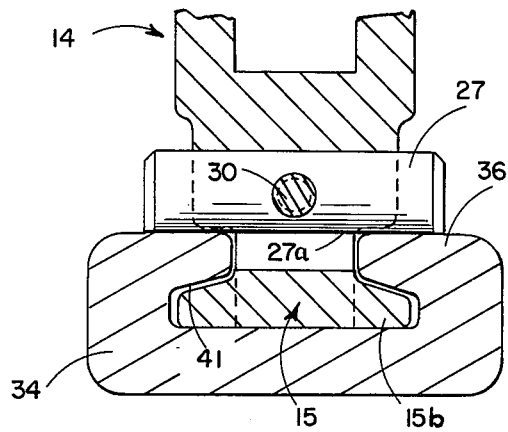
FIG. 4 is a cross sectional view taken along the plane indicated by 4—4 in FIG. 3.
Figure 5:
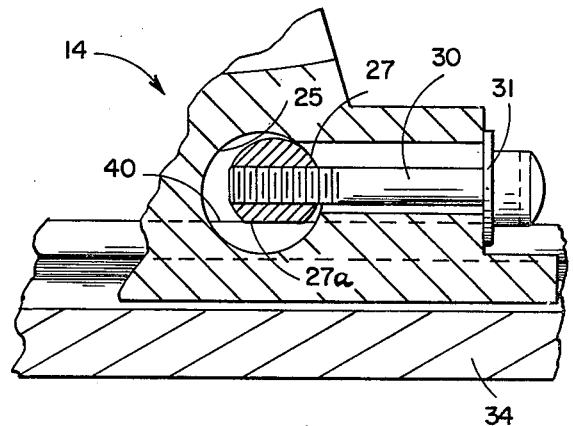
FIG. 5 is a cross sectional view showing the device of the invention installed in the track with the anti-rattling adjustment of the invention having been made.
Figure 3:
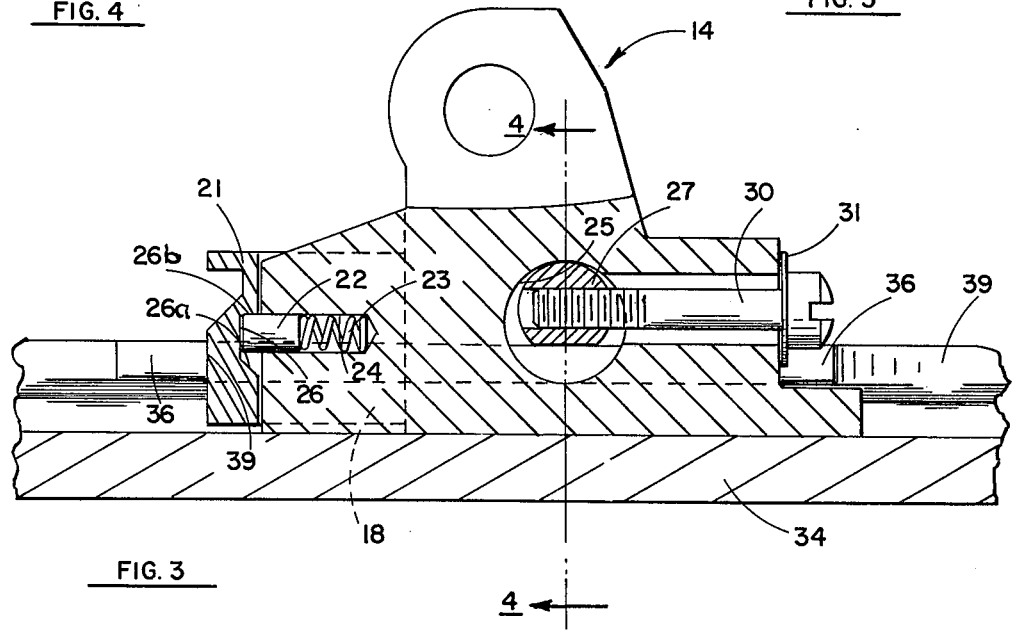
FIG. 3 is a cross sectional view showing the preferred embodiment placed in its installed position in a track but without the anti-rattling adjustment of the invention having been made.

Referring now to FIGS. 3 and 4, the anchor fitting of the invention is shown mounted in a track 34. The shoulders 15b of pads 15 are located under flange portions 36 of the track while the plunger 21 is seated in one of the notched portions 39 of the track to retain the fitting in the track. In this initial positioning of the anchor fitting in the track, as shown in FIGS. 3 and 4, screw 30 is in its untightened position such that the top of bar 27 rides against the top wall portion of aperture 25 as shown in FIG. 3. Under such conditions there is a space 41 between the upper surfaces of pads 15 and the inner wall of track 34, such as to allow play between the fitting and track and permit a small amount of relative movement between the fitting and the track which will result in rattling. When however screw 30 is tightened so as to draw bar 27 towards the head of the screw, the wall of bar 27 slides around the wall of apertured portion 25 to the position shown in FIG. 5 such that the bar is cammed downwardly by the aperture wall so that the flat face 27a thereof is pressed tightly against the top surface 40 of the track. This causes the fitting to be lifted upwardly in the track slots such that shoulder portions 15b abut tightly against the flange portions 36 of the track. In this manner the rattling is eliminated.

While the invention has been described and illustrated in detail, it is to be clearly understood that this is intended by way of illustration and example only and is not to be taken by way of limitation, the spirit and scope of this invention being limited only by the terms of the following claims.

We claim:

1. In an anchor fitting for securing loads to a retainer track, said track having a top surface and a longitudinal slot and spaced notch portions separated by neck portions formed by a pair of oppositely positioned flanges, the anchor fitting having a pair of pad members positioned in the track slot under said pair of flanges and a latching plunger member positioned in one of the track member notches, the improvement being means for preventing the rattling of said fitting in said track comprising:
   an apertured portion having an arcuate wall formed in said fitting,
   a substantially cylindrical bar member placed in said apertured portion, the diameter of said bar member being less than that of said apertured portion, said bar member having a first surface which abuts against the surface of the track and a second substantially cylindrical surface which abuts against the arcuate wall of said apertured portion, and
   means for driving said second surface of said bar member slidably along the arcuate wall of said apertured portion and said first bar member surface slidably along the track surface whereby said driving action causes the first surface of said bar member to be cammmed against the top surface of the track, thereby causing the fitting to be driven upwardly relative to the track to bring the pad members into tight abutment against said flanges.

2. The device of claim 1 wherein said means for driving said bar member surfaces comprises a screw which threadably engages said bar member and which when tightened draws the second surface of said bar member slidably along the wall of said apertured portion.

3. The device of claim 1 wherein the first surface of said bar member is a flattened surface

* * * * *